(12) United States Patent
Baran et al.

(10) Patent No.: US 12,124,027 B2
(45) Date of Patent: Oct. 22, 2024

(54) MEMS SCANNER

(71) Applicant: Microsoft Technology Licensing, LLC, Redmond, WA (US)

(72) Inventors: Utku Baran, Seattle, WA (US); Wyatt Owen Davis, Bothell, WA (US); Joshua Owen Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 17/645,704

(22) Filed: Dec. 22, 2021

(65) Prior Publication Data

US 2022/0113534 A1    Apr. 14, 2022

Related U.S. Application Data

(63) Continuation of application No. 16/384,685, filed on Apr. 15, 2019, now Pat. No. 11,221,478.

(51) Int. Cl.
    *G02B 26/08* (2006.01)
    *G02B 26/10* (2006.01)

(52) U.S. Cl.
    CPC ....... *G02B 26/0858* (2013.01); *G02B 26/101* (2013.01)

(58) Field of Classification Search
    CPC .......................... G02B 26/0858; G02B 26/105
    See application file for complete search history.

(56) References Cited

U.S. PATENT DOCUMENTS

| | | | | |
|---|---|---|---|---|
| 6,671,078 B2 * | 12/2003 | Flanders | ............... | B81B 3/0021 359/254 |
| 7,301,689 B2 * | 11/2007 | Fu | ...................... | G02B 26/0841 359/290 |
| 8,792,151 B2 * | 7/2014 | Nakazono | ............... | G02B 26/08 359/199.1 |
| 8,879,132 B2 * | 11/2014 | Naono | .................... | G02B 26/08 359/200.7 |
| 9,030,721 B2 * | 5/2015 | Naono | ............... | G02B 26/0858 359/200.1 |

(Continued)

FOREIGN PATENT DOCUMENTS

| | | | | |
|---|---|---|---|---|
| CN | 104166232 B | * | 5/2017 | ........... B81B 3/0045 |
| EP | 3343265 A1 | * | 7/2018 | ........... B81B 3/0083 |

(Continued)

OTHER PUBLICATIONS

"Office Action Issued in European Patent Application No. 20720880.2", Mailed Date: Jul. 7, 2023, 6 Pages.

*Primary Examiner* — Christopher Stanford
(74) *Attorney, Agent, or Firm* — Alleman Hall & Tuttle LLP (57) ABSTRACT

A MEMS scanner may include a first flexible arm extending substantially in a forward direction and a base connected to a proximal end of the first flexible arm, the base being thicker than the first flexible arm in a vertical direction. The MEMS scanner may further include a second flexible arm connected to a distal end of the first flexible arm, the second flexible arm extending substantially in a reverse direction. The MEMS scanner may further include a mirror coupled to a distal end of the second flexible arm. In one implementation, the MEMS scanner may be a non-resonant scanner.

18 Claims, 4 Drawing Sheets

(56) References Cited

U.S. PATENT DOCUMENTS

| | | | | |
|---|---|---|---|---|
| 10,048,489 B2* | 8/2018 | Naono | ............... | H10N 30/2044 |
| 10,459,217 B2* | 10/2019 | Oyama | ............. | G02B 26/0858 |
| 10,558,033 B2* | 2/2020 | Sakurai | ................ | G02B 26/101 |
| 11,086,122 B2* | 8/2021 | Carminati | ............ | G02B 26/105 |
| 2002/0118910 A1* | 8/2002 | Okumura | ............. | G02B 6/3578 |
| | | | | 359/872 |
| 2005/0185239 A1* | 8/2005 | Orcutt | ................. | G02B 26/0833 |
| | | | | 359/199.1 |
| 2012/0243064 A1* | 9/2012 | Tani | ..................... | G02B 26/101 |
| | | | | 359/199.1 |
| 2012/0250124 A1* | 10/2012 | Choi | .................... | G02B 26/105 |
| | | | | 359/198.1 |

FOREIGN PATENT DOCUMENTS

| | | | | |
|---|---|---|---|---|
| JP | H09504398 A | * | 4/1997 | |
| JP | 2012151651 A | * | 8/2012 | |

* cited by examiner

MEMS SCANNER

CROSS REFERENCE TO RELATED APPLICATIONS

This application is a continuation of U.S. patent application Ser. No. 16/384,685, filed Apr. 15, 2019, the entirety of which is hereby incorporated herein by reference for all purposes.

BACKGROUND

Scanning mirrors are used in a wide variety of applications, such as display systems, imaging systems, and LIDAR systems. In each system, light from a light source is scanned in one or more directions via a controllable mirror or a set of controllable mirrors.

SUMMARY

A MEMS scanner is disclosed herein, which may include a first flexible arm extending substantially in a forward direction and a base connected to a proximal end of the first flexible arm, the base being thicker than the first flexible arm in a vertical direction. The MEMS scanner may further include a second flexible arm connected to a distal end of the first flexible arm, the second flexible arm extending substantially in a reverse direction. The MEMS scanner may further include a mirror coupled to a distal end of the second flexible arm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In some scanning display systems, laser light is reflected by a mirror assembly at different angles to project reflected laser light throughout a field-of-view (FOV). Other optical systems such as imaging systems and LIDAR systems may similarly utilize a mirror assembly to reflect laser light. To achieve a range of reflection angles, the mirror assembly may include one or more actuators to rotate one or more mirrors of the mirror assembly. Various types of scanning mirrors may be used, including microelectromechanical system (MEMS) mirrors.

One or more mirrors of a MEMS mirror assembly may be rotated about an axis in horizontal and/or vertical directions to produce viewable images in a FOV in a display system. In different examples, the mirror assembly may include a single mirror driven in both horizontal and vertical directions (2-dimensional, or 2D), or two mirrors separately driven in horizontal and vertical directions (1-dimensional, or 1D). Different scan rates may be employed in the horizontal and vertical directions. In a two-mirror system, for example, a horizontal scanning mirror may be driven at a relatively fast rate (e.g., ~27 kHz), whereas a vertical scanning mirror may be driven at a relatively slower rate (e.g., ~60 Hz). The horizontal and vertical scan rates may at least partially determine the resolution of images generated at these rates, along with other factors such as mirror aperture (e.g., diameter) and scan angle.

Non-resonant scanning mirrors are suitable for 1D rotation as a slow scanner. Piezoelectric actuators are commonly used in resonant scanning mirrors, but present difficulties when used in non-resonant applications. When the piezoelectric material of the actuator is actuated, only slight motion is typically generated outside of a resonant frequency. With only slight motion, the scanning mirror will have a very narrow displacement angle and implementing the scanning mirror in a display system, for example, would be difficult.

Figure 1:
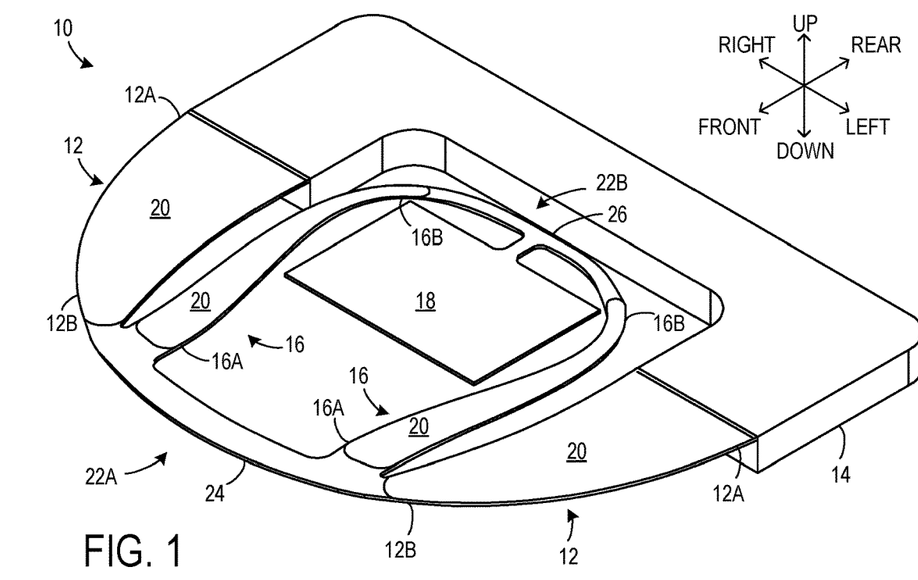
FIG. 1 shows a perspective view of a MEMS scanner according to a first embodiment of the present disclosure.

To address these issues, FIG. 1 shows a perspective view of a MEMS scanner 10 according to a first embodiment of the present disclosure. The MEMS scanner 10 may include a first flexible arm 12 extending substantially in a forward direction, and a base 14 connected to a proximal end 12A of the first flexible arm 12. Here, the first flexible arm 12 has a curved outer edge and a slightly curved inner edge such that it is wider at its proximal end 12A than at its distal end 12B, and extends substantially forward. The base 14 may be thicker than the first flexible arm 12 in a vertical direction (denoted as "UP" and "DOWN" in FIG. 1) in order to provide a stable fulcrum for the proximal end 12A. The MEMS scanner 10 may include a second flexible arm 16 connected to the distal end 12B of the first flexible arm 12, and the second flexible arm 16 may extend substantially in a reverse direction (e.g., the rearward direction which is the reverse of the forward direction in FIG. 1). Here, the second flexible arm 16 has curved edges and a distal end 16B thereof is curved inward, and the second flexible arm 16 extends substantially rearward. Finally, The MEMS scanner 10 may include a mirror 18 coupled to the distal end 16B of the second flexible arm 16. While the mirror 18 is illustrated here as a rectangle, any suitable shape may be adopted.

Figure 2:
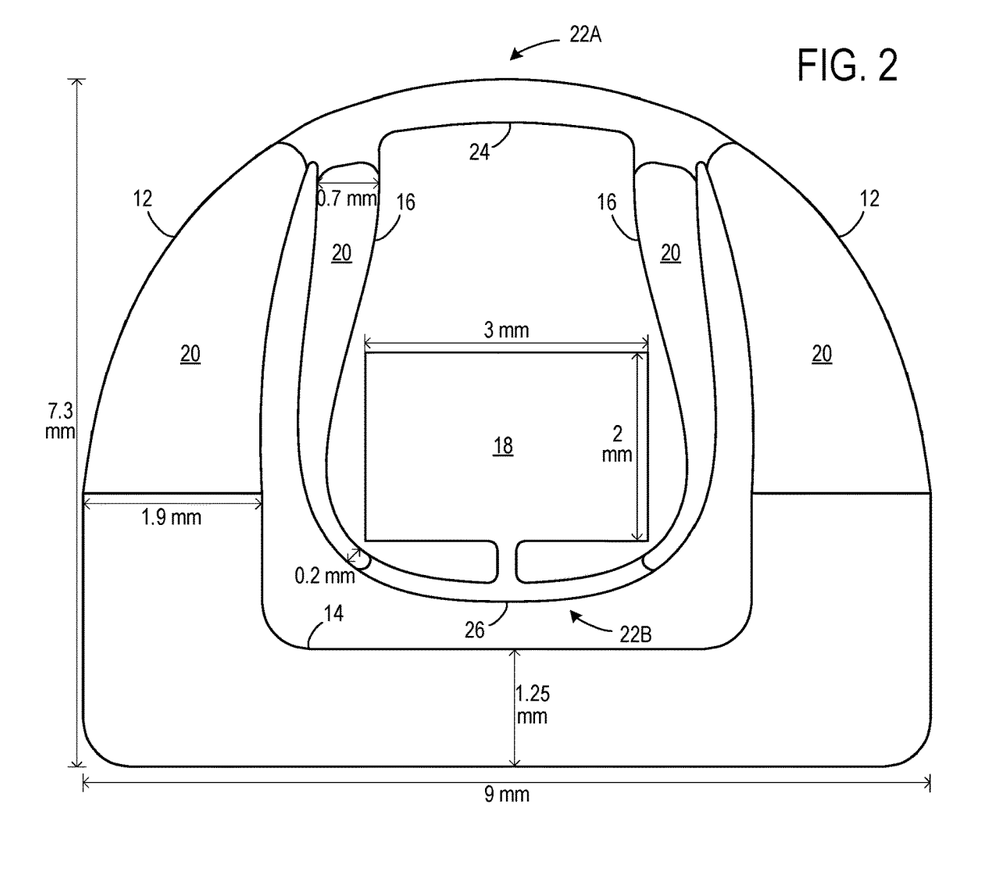
FIG. 2 shows a top view of the MEMS scanner of FIG. 1.

FIG. 2 shows a top view of the MEMS scanner 10 of FIG. 1. Both FIGS. 1 and 2 illustrate that the MEMS scanner 10 may include a thin film 20 of a piezoelectric material on each of the first and second flexible arms 12, 16. The piezoelectric material may be a ceramic material such as lead zirconate titanate (PZT), which may be doped to adjust its piezoelectric constant. The thin films 20 may be formed by any suitable method, including chemical vapor deposition, electron beam evaporation, etc.

Other than the thin films 20, the main body of the MEMS scanner 10, such as the arms 12, 16 and base 14, as well as the mirror 18, may be made of silicon. Each silicon piece may be formed integrally together by, for example, reactive ion etching, sputtering, and/or other process(es). The MEMS scanner 10 may be a non-resonant scanner, sometimes referred to as "linear," and thus is not configured to vibrate at or near a single resonant frequency.

The piezoelectric material in the thin film 20 may expand or contract according to a voltage applied thereto, causing motion in the flexible arms 12, 16. Since each arm 12, 16 is wider at its proximal end 12A, 16A than at its distal end 12B, 16B, the force pushing on the respective arm 12, 16 from the actuated piezoelectric material may be stronger toward the proximal end 12A, 16A compared to at its distal end 12B, 16B. As each proximal end 12A, 16A is adjacent the fulcrum of the bend, this translates into increased motion compared to having the same thickness at each distal end 12B, 16B.

Figure 3A:
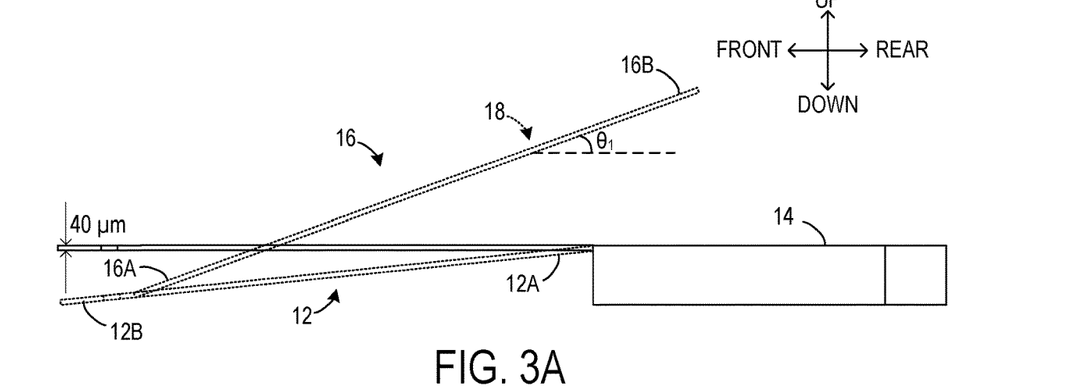
FIG. 3A shows a side view of the MEMS scanner of FIG. 1 in an actuated state.

FIG. 2 illustrates various dimensions for one example of the MEMS scanner 10. Here, the MEMS scanner 10 may be less than 10 mm wide by 10 mm long in total, and here, may be 9 mm wide by 7.3 mm long. The base 14 is illustrated as a U-shaped block, with the first flexible arm 12 attached at the top of one end of the U-shape. The length of the middle section of the U-shape may be 1.25 mm. The first flexible arm 12 may be wider than the second flexible arm 16. For example, the widest point of the first flexible arm 12, located adjacent the base 14, may be 1.9 mm. By contrast, the second flexible arm 16 may range in this example from 0.2 mm at its narrowest to 0.7 mm at its widest. The mirror 18 supported by the second flexible arm 16 may be 3 mm wide by 2 mm long. The second flexible arm 16 may be made smaller than the first flexible arm 12 due to the mass of the mirror 18 needed to be moved when the second flexible arm 16 moves. A thickness of the first flexible arm 12 may be 20-60 µm, and here, may be 40 µm (see FIG. 3). Further, a thickness of the second flexible arm 16 may be the same.

While a single first flexible arm 12 and a single second flexible arm 16 have been described thus far, the first flexible arm 12 may be one of a pair of first flexible arms 12, and the second flexible arm 16 may be one of a pair of second flexible arms 16. The MEMS scanner 10 may be substantially symmetric on its left and right sides, which may provide additional control for limiting motion to one desired dimension. Alternatively, the MEMS scanner 10 may be asymmetric, as in a second embodiment described with reference to FIG. 4.

A first arch 22A may be formed by the pair of first flexible arms 12 and a first support bar 24 connecting the distal ends 12B thereof. Similarly, a second arch 22B may be formed by the pair of second flexible arms 16 and a second support bar 26 connecting distal ends 16B thereof, and the second flexible arms 16 may be connected to the mirror 18 via the second support bar 26. The second arch 22B may be nested inside the first arch 22A and arranged in a reverse orientation relative to the first arch 22A. In this manner, the first arch 22A formed by the pair of first flexible arms 12 may be configured to pivot where it is anchored at the base 14 in the form of a living hinge, and the second arch 22B formed by the pair of second flexible arms 16 may be configured to pivot where it is anchored at the first arch 22A in the form of a living hinge. Each of the support bars 24, 26 may stabilize the respective arms 12, 16 when bending upward or downward, and suppress movement in a second dimension such as twisting to the side.

Figure 3B:
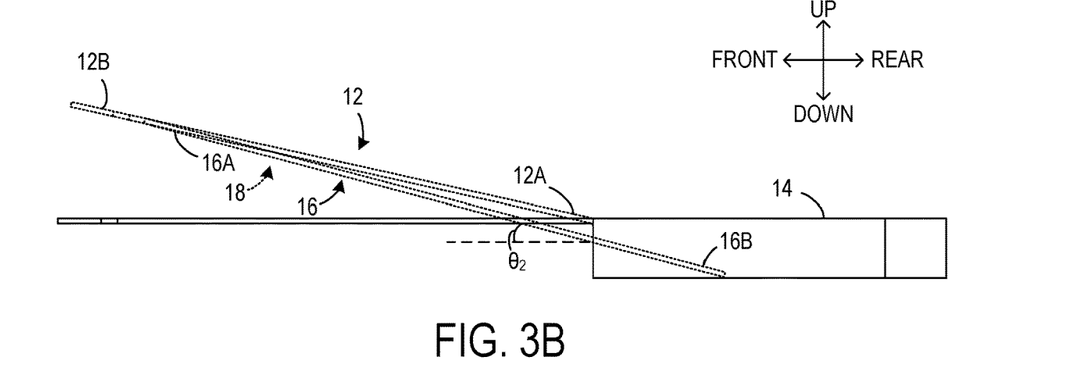
FIG. 3B shows a side view of the MEMS scanner of FIG. 1 in a reverse actuated state.

FIG. 3A shows a side view of the MEMS scanner of FIG. 1 in an actuated state, and FIG. 3B shows a side view of the MEMS scanner of FIG. 1 in a reverse actuated state. The displacement of the arms 12, 16 is exaggerated for illustration. Rather, a maximum angular displacement (mechanical) of the mirror 18 is 12°, which is the total of the angles $\theta_1$ and $\theta_2$. In addition, while the arms 12, 16 are illustrated as extending linearly from a bent point during actuation for simplicity, in actuality, some curvature is generally present during actuation.

After the thin films 20 of the first flexible arms 12 are actuated with a positive voltage, the piezoelectric material of the thin films 20 expands and bends the first flexible arms 12 downward from the proximal ends 12B which are held in place by the substantially larger base 14 (see FIG. 3A). Because the proximal ends 16A of the second flexible arms 16 are attached to the distal ends 12B of the first flexible arms 12, when the distal ends 12B move further downward than any other part of the first flexible arms 12, the proximal ends 16A of the second flexible arms 16 are brought downward and the distal ends 16B tilt upward compared to the flat state of FIGS. 1 and 2. In addition, if the thin films 20 of the second flexible arms 16 are actuated by a negative voltage, the second flexible arms 16 will bend in the opposite direction of the first flexible arms 12 at their proximal ends 16A, lifting their distal ends 16A further upward. This double leverage configuration may increase the angular displacement of the mirror 18 held by the second support bar 26 (see FIGS. 1-2) between the second flexible arms 16 compared to a configuration with only one pivot point. Accordingly, the typically low mobility of piezoelectric actuators outside of a resonant frequency may be compensated without introducing unwanted twisting.

In FIG. 3B, the polarity of the voltages is reversed, so that a negative voltage is applied to the first flexible arms 12, causing them to rise upward, and a positive voltage is applied to the second flexible arms 16, causing them to bend downward. The downward displacement of the second flexible arms 16 in FIG. 3B as well as of the first flexible arms 12 in FIB. 3A is limited by the vertical thickness of the base 14. Accordingly, the base 14 may be set to be as thick as the maximum desired negative displacement of the arms 12, 16, and may differ from the thickness illustrated in the drawings.

Figure 4:
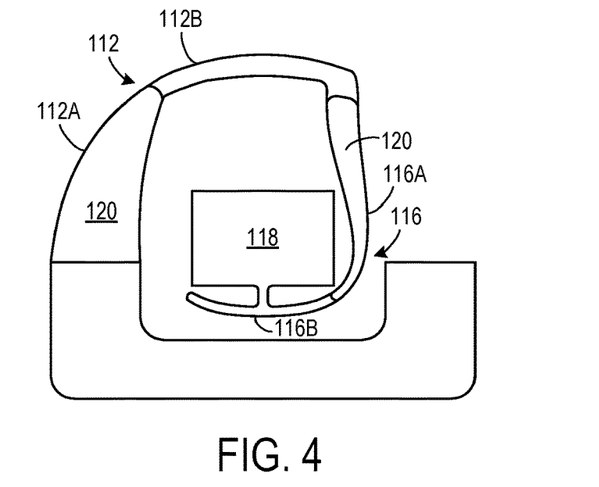
FIG. 4 shows a top view of a MEMS scanner according to a second embodiment of the present disclosure.

FIG. 4 shows a top view of a MEMS scanner 110 according to a second embodiment of the present disclosure. As briefly discussed above, rather than the symmetric configuration of the MEMS scanner 10, the MEMS scanner 110 may be asymmetric. Accordingly, the MEMS scanner 110 may include only one first flexible arm 112 and only one second flexible arm 116, both of which include a curved portion 112B, 116B after a straight extending portion 112A, 116A, to accommodate a mirror 118 between the arms 112, 116. Compared to the MEMS scanner 10, the MEMS scanner 110 with single arms 112, 116 may experience increased twisting. To reduce twisting somewhat, thin films 120 may be placed only on the substantially straight portions 112A, 116A, and various portions of the MEMS scanner 110 may be weighted differently.

Figure 5:
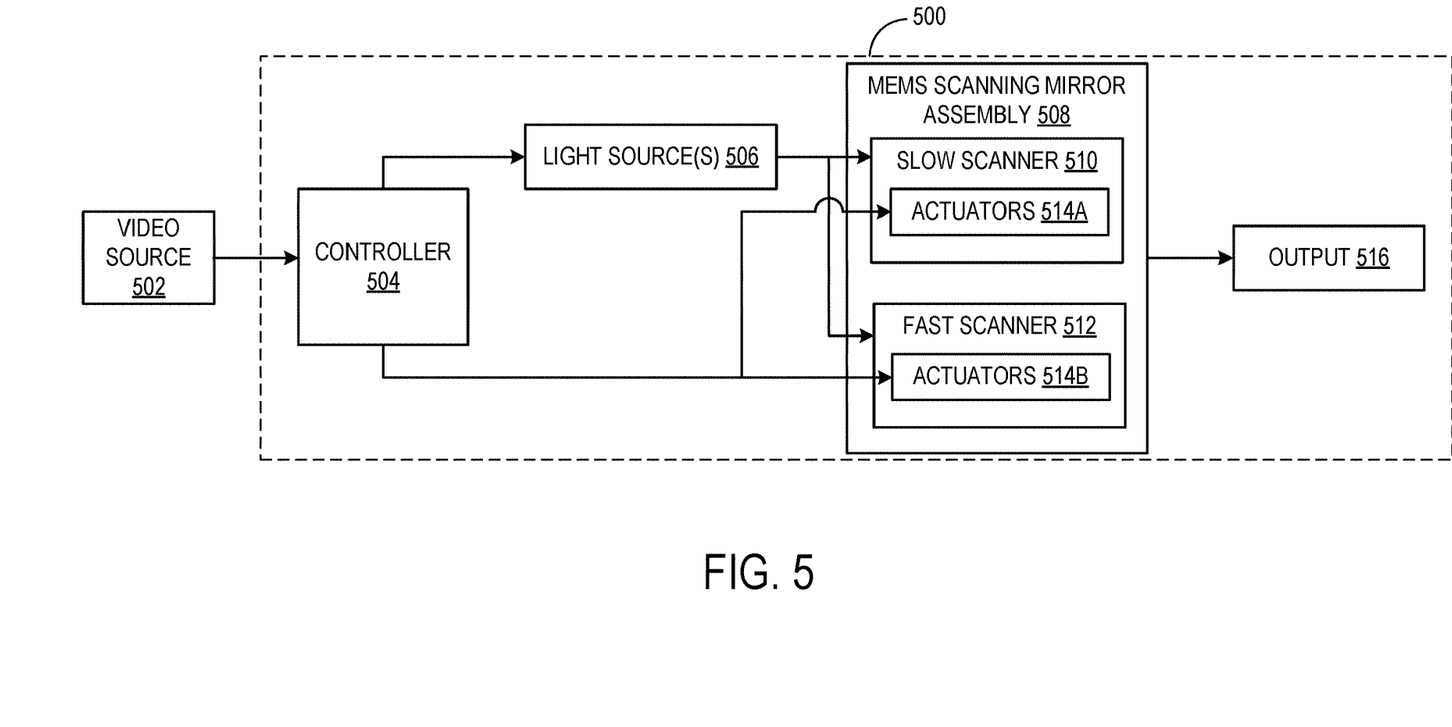
FIG. 5 shows a schematic view of an exemplary display system including the MEMS scanner of FIG. 1.

FIG. 5 shows a schematic view of an exemplary display system 500 including the MEMS scanner 10 of FIG. 1. The display system 500 may be used in conjunction with, or incorporated in, a computing device such as a tablet, smartphone, laptop computer, desktop computer, or head-mounted display, for example. An image or video source 502 may be captured by a camera, rendered by a processor running a program to create the video to be displayed, or stored in memory, for example. A controller 504 such as a processor with associated memory may be configured to direct one or more light sources 506, based on the video source 502, to a MEMS scanning mirror assembly 508. The MEMS scanning mirror assembly 508 may comprise a slow scanner 510 configured to scan in a first direction, and a fast scanner 512 configured to scan in a second direction perpendicular to the first direction. The slow scanner 510 may be a vertical scanning mirror, and the fast scanner 512 may be a horizontal scanning mirror. The slow scanner 510 may be the MEMS scanner 10 or 110, for example. The fast scanner 512 may be a resonant scanner, for example.

In addition, the controller 504 may be configured to control actuators 514A, 514B of each of the scanners 510, 512. The actuators 514A may include the piezoelectric thin films 20 of the MEMS scanner 10 or 110, for example. Further, the actuators 514A may include a voltage source controllable by the controller 504 to apply a voltage to the piezoelectric thin films 20. The voltage may be applied as a ramp signal, for example. On the other hand, the actuators 514B may be of any suitable type for a fast scanner, which may include piezoelectric actuators, bimetallic strips, magnetic actuators, electrostatic actuators, and/or movable masses. Finally, the light reflected by the scanners 510, 512 of the MEMS scanning mirror assembly 508 may be output 516 on a display screen, for example, to display the video.

Figure 6:
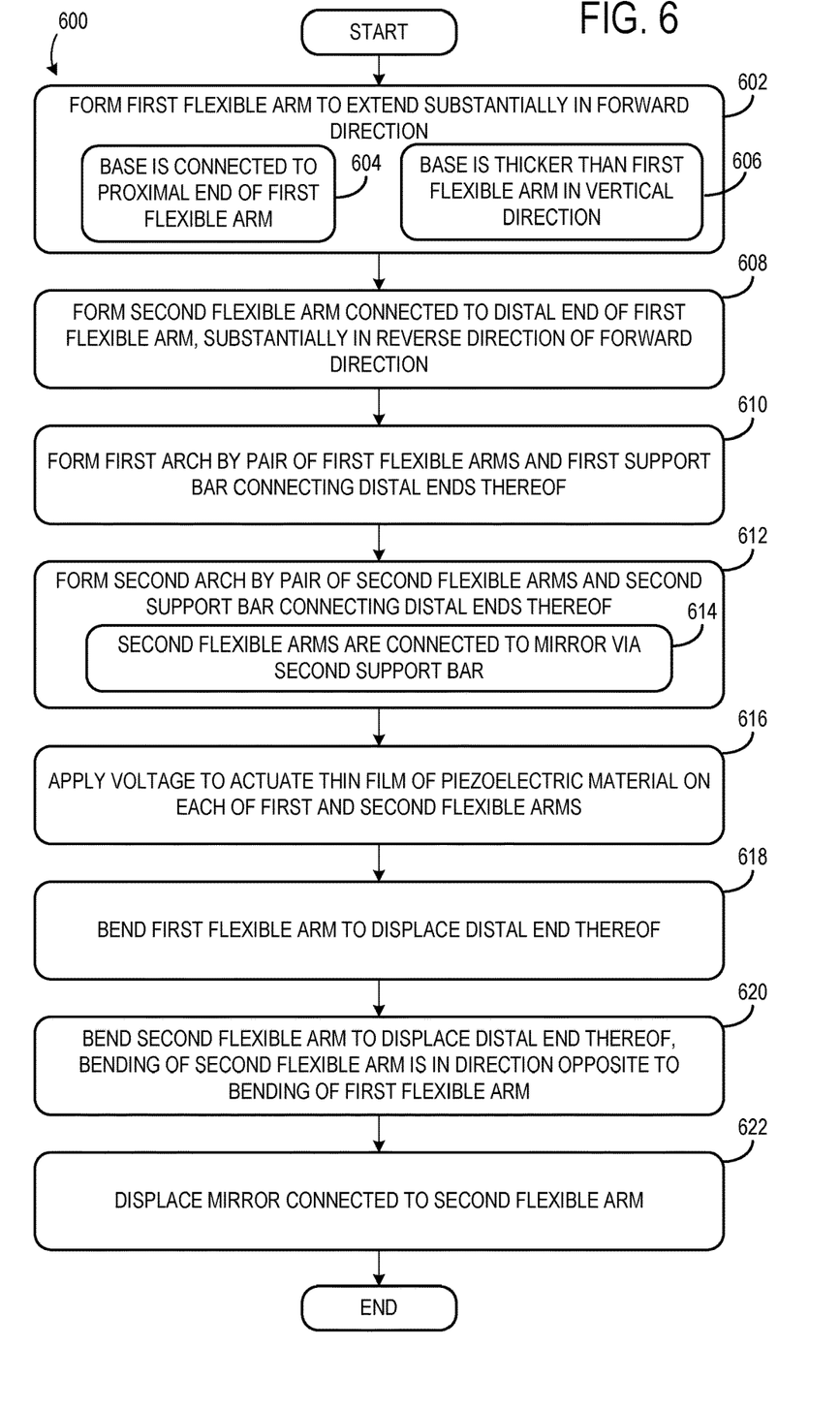
FIG. 6 shows a flowchart of a scanning method for a MEMS scanner.

FIG. 6 shows a flowchart of a scanning method 600 for a MEMS scanner. The following description of method 600 is provided with reference to the MEMS scanner 10 described above and shown in FIGS. 1-3B. It will be appreciated that method 600 may also be performed in other contexts using other suitable components.

With reference to FIG. 6, at 602, the method 600 may include forming a first flexible arm to extend substantially in a forward direction. At 604, a base may be connected to a proximal end of the first flexible arm, and at 606, the base may be thicker than the first flexible arm in a vertical direction. As discussed above, a thick base may provide a stable support for the first flexible arm. In contrast, a thickness of the first flexible arm may be 20-60 μm, and may be 40 μm in some embodiments. At 608, the method 600 may include forming a second flexible arm connected to a distal end of the first flexible arm, the second flexible arm extending substantially in a reverse direction of the forward direction. The first flexible arm may be wider than the second flexible arm, which may allow the second flexible arm to move while supporting other components having considerable mass.

In some cases, the first flexible arm may be one of a pair of first flexible arms, and the second flexible arm may be one of a pair of second flexible arms. In such a case, at 610, the method 600 may include forming a first arch by the pair of first flexible arms and a first support bar connecting the distal ends thereof. At 612, the method 600 may include forming a second arch by the pair of second flexible arms and a second support bar connecting the distal ends thereof. At 614, the second flexible arms may be connected to the mirror via the second support bar. In this manner, the nested arches discussed above may be formed.

At 616, the method 600 may include applying a voltage to actuate a thin film of a piezoelectric material on each of the first and second flexible arms. The voltage may be controlled by a controller, as discussed above. As a result of applying the voltage, at 618, the method 600 may include bending the first flexible arm to displace the distal end thereof, and at 620, the method 600 may include bending the second flexible arm to displace a distal end thereof, the bending of the second flexible arm being in a direction opposite to the bending of the first flexible arm. Adjusting the voltage applied to each arm may adjust the direction (e.g., up or down) and magnitude of the bending. As a result of the bending of the arms, at 622, the method 600 may include displacing a mirror connected to the second flexible arm. The MEMS scanner may be a non-resonant scanner, and may be configured to scan along one axis using the mirror displaced at varying angles. A maximum angular displacement (mechanical) of the mirror may be 12°.

In some embodiments, devices described herein may be tied to a computing system of one or more computing devices. Such computing devices may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. One such computing device is the controller 504 which controls the MEMS scanner 10 or 110, and the computing device used in conjunction with, or incorporating, the display system 500.

The computing device may include a logic processor, volatile memory, and a non-volatile storage device. The logic processor includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

The non-volatile storage device may include one or more physical devices configured to hold instructions executable by the logic processors to implement portions of the methods and processes described herein. When such methods and processes are implemented, the state of non-volatile storage device may be transformed—e.g., to hold different data.

The non-volatile storage device may include physical devices that are removable and/or built-in. Non-volatile storage device ?06 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The non-volatile storage device may include nonvolatile, dynamic, static, read/write, read-only, sequential-access, location-addressable, file-addressable, and/or content-addressable devices. It will be appreciated that the non-volatile storage device is configured to hold instructions even when power is cut to the non-volatile storage device.

The volatile memory may include physical devices that include random access memory. The volatile memory is typically utilized by the logic processor to temporarily store information during processing of software instructions. It will be appreciated that the volatile memory typically does not continue to store instructions when power is cut to the volatile memory.

Aspects of the logic processor, the volatile memory, and the non-volatile storage device may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The following paragraphs provide additional support for the claims of the subject application. One aspect provides A MEMS scanner comprising a first flexible arm extending substantially in a forward direction, a base connected to a proximal end of the first flexible arm, the base being thicker than the first flexible arm in a vertical direction, a second flexible arm connected to a distal end of the first flexible arm, the second flexible arm extending substantially in a reverse direction, and a mirror coupled to a distal end of the second flexible arm. In this aspect, additionally or alternatively, the MEMS scanner may be a non-resonant scanner. In this aspect, additionally or alternatively, the MEMS scanner may further comprise a thin film of a piezoelectric material on each of the first and second flexible arms. In this aspect, additionally or alternatively, the first flexible arm may be wider than the second flexible arm. In this aspect, additionally or alternatively, the first flexible arm may be one of a pair of first flexible arms, and the second flexible arm may be one of a pair of second flexible arms. In this aspect, additionally or alternatively, a first arch may be formed by the pair of first flexible arms and a first support bar connecting the distal ends thereof. In this aspect, additionally or alternatively, a second arch may be formed by the pair of second flexible arms and a second support bar connecting distal ends thereof, and the second flexible arms may be connected to the mirror via the second support bar. In this aspect, additionally or alternatively, the MEMS scanner may be less than 10 mm wide by 10 mm long. In this aspect, additionally or alternatively, a thickness of the first flexible arm may be 40 µm. In this aspect, additionally or alternatively, a maximum angular displacement of the mirror may be 12°.

Another aspect provides a scanning method for a MEMS scanner. The method may comprise forming a first flexible arm to extend substantially in a forward direction, wherein a base is connected to a proximal end of the first flexible arm, the base being thicker than the first flexible arm in a vertical direction, forming a second flexible arm connected to a distal end of the first flexible arm, the second flexible arm extending substantially in a reverse direction of the forward direction, bending the first flexible arm to displace the distal end thereof, bending the second flexible arm to displace a distal end thereof, wherein the bending of the second flexible arm is in a direction opposite to the bending of the first flexible arm, and displacing a mirror connected to the second flexible arm. In this aspect, additionally or alternatively, the MEMS scanner may be a non-resonant scanner. In this aspect, additionally or alternatively, the method may further comprise applying a voltage to actuate a thin film of a piezoelectric material on each of the first and second flexible arms. In this aspect, additionally or alternatively, the first flexible arm may be wider than the second flexible arm. In this aspect, additionally or alternatively, the first flexible arm may be one of a pair of first flexible arms, and the second flexible arm may be one of a pair of second flexible arms. In this aspect, additionally or alternatively, the method may further comprise forming a first arch by the pair of first flexible arms and a first support bar connecting the distal ends thereof. In this aspect, additionally or alternatively, the method may further comprise forming a second arch by the pair of second flexible arms and a second support bar connecting the distal ends thereof. The second flexible arms may be connected to the mirror via the second support bar. In this aspect, additionally or alternatively, a thickness of the first flexible arm may be 40 µm. In this aspect, additionally or alternatively, a maximum angular displacement of the mirror may be 12°.

Another aspect provides a MEMS scanning mirror assembly comprising a slow scanner configured to scan in a first direction. The slow scanner may comprise a first flexible arm extending substantially in a forward direction, a base connected to a proximal end of the first flexible arm, the base being thicker than the first flexible arm, a second flexible arm connected to a distal end of the first flexible arm, the second flexible arm extending substantially in a reverse direction, and a mirror connected to the second flexible arm. The MEMS scanning mirror assembly may further comprise a fast scanner configured to scan in a second direction perpendicular to the first direction.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An asymmetric MEMS scanner comprising:
   a first flexible arm extending substantially in a forward direction and then curving to extend substantially in a first lateral direction, from a proximal end thereof to a distal end thereof;
   a base connected to the proximal end of the first flexible arm, the base being thicker than the first flexible arm in a vertical direction;
   a second flexible arm connected to the distal end of the first flexible arm at a proximal end thereof, the second flexible arm extending substantially in a rearward direction which is reverse of the forward direction and then curving to extend in a second lateral direction which is reverse of the first lateral direction, from the proximal end thereof to a distal end thereof; and
   a mirror coupled to a laterally extending portion of the second flexible arm in a vicinity of the distal end of the second flexible arm, wherein
   the first flexible arm is wider than the second flexible arm, and
   a thin film of a piezoelectric material on each of the first and second flexible arms.

2. The asymmetric MEMS scanner of claim 1, wherein the MEMS scanner is a non-resonant scanner.

3. The asymmetric MEMS scanner of claim 1, wherein the first flexible arm gradually tapers from a width at the proximal end thereof to a narrower width at the distal end thereof.

4. The asymmetric MEMS scanner of claim 1, wherein the second flexible arm gradually tapers from a width at the proximal end thereof to a narrower width at the distal end thereof.

5. The asymmetric MEMS scanner of claim 4, wherein the mirror is accommodated between the first flexible arm and the second flexible arm.

6. The asymmetric MEMS scanner of claim 1, wherein the MEMS scanner is less than 10 mm wide by 10 mm long.

7. The asymmetric MEMS scanner of claim 1, wherein a thickness of the first flexible arm is 40 µm.

8. The asymmetric MEMS scanner of claim 1, wherein a maximum mechanical angular displacement of the mirror is 12°.

9. A scanning method for an asymmetric MEMS scanner, the method comprising:
forming a first flexible arm to extend substantially in a forward direction and then curve to extend substantially in a first lateral direction, from a proximal end thereof to a distal end thereof, wherein a base is connected to the proximal end of the first flexible arm, the base being thicker than the first flexible arm in a vertical direction;
forming a second flexible arm connected to the distal end of the first flexible arm at a proximal end thereof, the second flexible arm extending substantially in a rearward direction which is reverse of the forward direction and then curving to extend in a second lateral direction which is reverse of the first lateral direction, from the proximal end thereof to a distal end thereof;
bending the first flexible arm to displace the distal end thereof;
bending the second flexible arm to displace the distal end thereof, wherein the bending of the second flexible arm is in a direction opposite to the bending of the first flexible arm; and
displacing a mirror connected to a laterally extending portion of the second flexible arm in a vicinity of the distal end of the second flexible arm, wherein
the first flexible arm is wider than the second flexible arm.

10. The scanning method of claim 9, wherein the MEMS scanner is a non-resonant scanner.

11. The scanning method of claim 9, further comprising applying a voltage to actuate a thin film of a piezoelectric material on each of the first and second flexible arms.

12. The scanning method of claim 9, wherein the first flexible arm gradually tapers from a width at the proximal end thereof to a narrower width at the distal end thereof.

13. The scanning method of claim 12, wherein the second flexible arm gradually tapers from a width at the proximal end thereof to a narrower width at the distal end thereof.

14. The scanning method of claim 13, further comprising accommodating the mirror between the first flexible arm and the second flexible arm.

15. The scanning method of claim 9, wherein a maximum mechanical flexible arm is 40 µm.

16. The scanning method of claim 9, wherein a thickness of the first angular displacement of the mirror is 12°.

17. An asymmetric MEMS scanning mirror assembly comprising:
a slow scanner configured to scan in a first direction, comprising:
a first flexible arm extending substantially in a forward direction and then curving to extend substantially in a first lateral direction, from a proximal end thereof to a distal end thereof;
a base connected to the proximal end of the first flexible arm, the base being thicker than the first flexible arm;
a second flexible arm connected to the distal end of the first flexible arm at a proximal end thereof, the second flexible arm extending substantially in a rearward direction which is reverse of the forward direction and then curving to extend in a second lateral direction which is reverse of the first lateral direction, from the proximal end thereof to a distal end thereof; and
a mirror connected to a laterally extending portion of the second flexible arm in a vicinity of the distal end of the second flexible arm; and
a fast scanner configured to scan in a second direction perpendicular to the first direction, wherein
the first flexible arm is wider than the second flexible arm, and
a thin film of a piezoelectric material on each of the first and second flexible arms.

18. The asymmetric MEMS scanning mirror assembly of claim 17, wherein the mirror is accommodated between the first flexible arm and the second flexible arm.

* * * * *